March 10, 1970   F. A. BERCZYNSKI   3,499,462
SLIDE VALVE CASING
Filed June 28, 1967   3 Sheets-Sheet 1
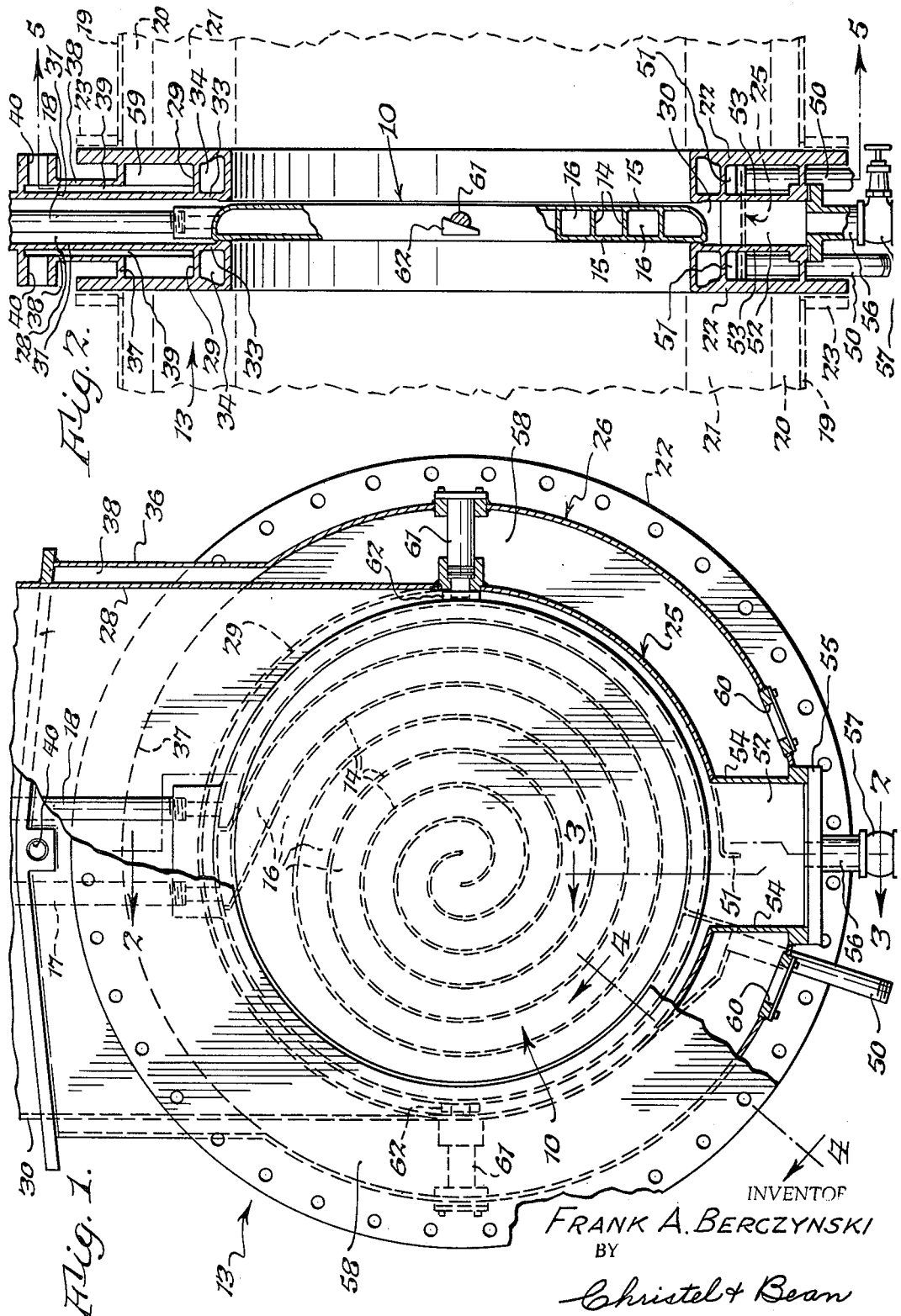

March 10, 1970
F. A. BERCZYNSKI
3,499,462
SLIDE VALVE CASING
Filed June 28, 1967
3 Sheets-Sheet 2
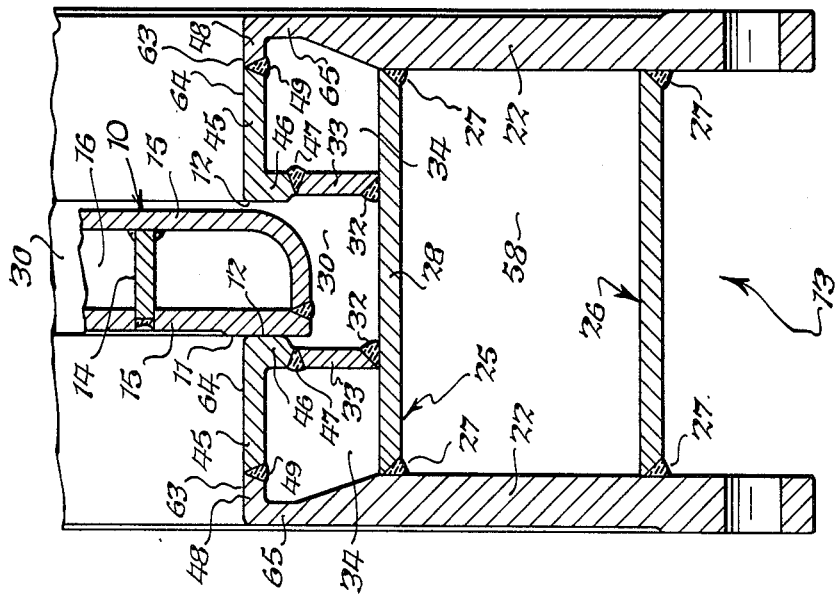
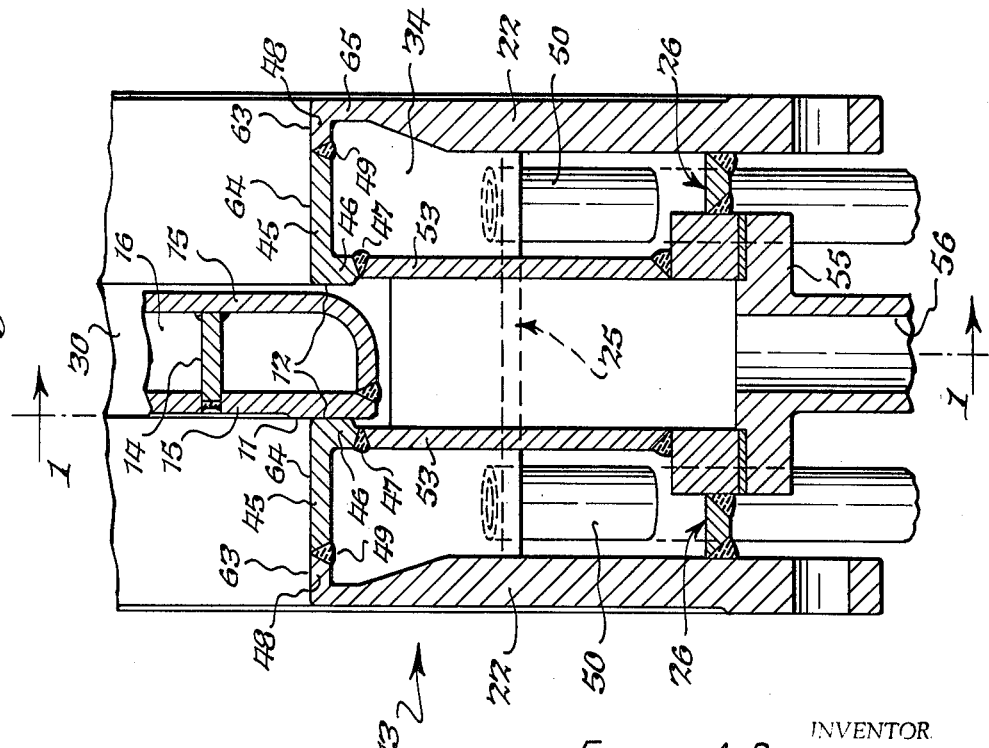
INVENTOR.
FRANK A. BERCZYNSKI
BY
Christel & Bean
ATTORNEYS.

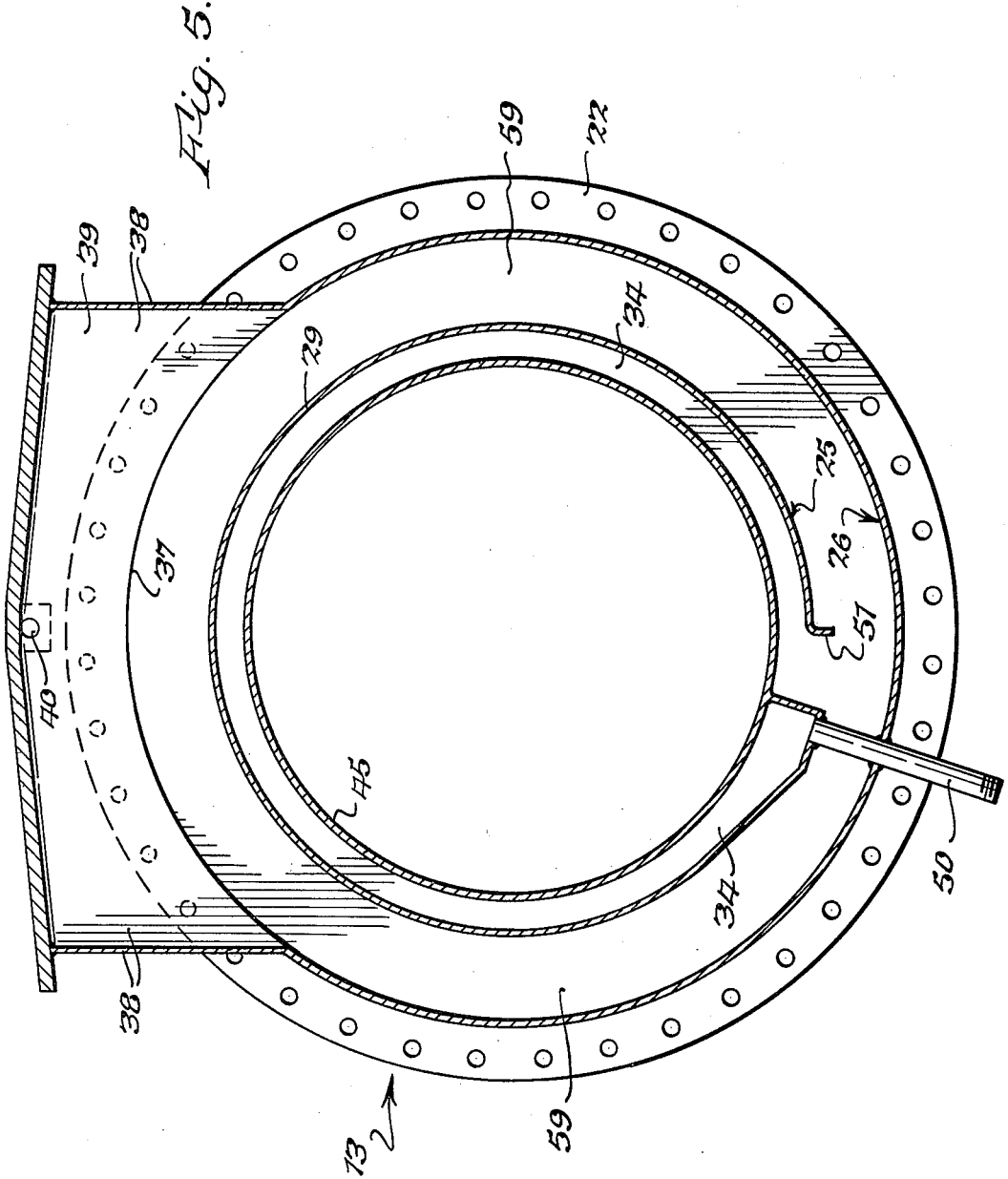

United States Patent Office 3,499,462
Patented Mar. 10, 1970

3,499,462
SLIDE VALVE CASING
Frank A. Berczynski, Williamsville, N.Y., assignor to A. E. Anderson Construction Corporation, Buffalo, N.Y.
Filed June 28, 1967, Ser. No. 649,615
Int. Cl. F16k *49/00*
U.S. Cl. 137—340                    10 Claims

ABSTRACT OF THE DISCLOSURE

The slide valve casing includes a sealing ring having a radially disposed annular sealing face along one edge for co-operating with a sealing face on a slide valve body. The sealing ring is welded at its other edge of the annular edge of a flange formed as an integral part of and projecting at a right angle from a radial support member, the inner surfaces of the sealing ring and flange forming a high temperature air passage. The sealing ring and support member together with a pair of right angularly related structural members form a built-up, welded cooling conduit outwardly about the sealing ring and flange to cool the same. The sealing ring, flange and an annular portion of the support member immediately adjacent the flange have substantially the same thickness, thereby providing uniform expansion. The weld at the junction of the sealing ring and the flange is disposed on the side thereof remote from the air passage and is directly exposed in the cooling conduit.

BACKGROUND OF THE INVENTION

This invention relates to casings for slide valves, and particularly to a slide valve casing for use in pressurized high temperature gas conduits.

Slide valves of the type here under consideration usually have a casing formed with an annular sealing face which cooperates with an annular sealing face on a radially slidable valve body to form a seal, the valve body acting in an axial direction when seating against the valve casing and stressing the same to provide a tight seal. This poses a problem in slide valves for the exit conduits from blast furnaces and stove installations, because such stressing is aggravated by the high temperatures and pressures to which the valves are subjected in such environments.

Accordingly, a problem exists in the economical formation of a slide valve casing which can withstand the heat stresses and axial thrust encountered in such adverse environments.

It is known to form valve casings of this type as integral castings. However, cast casings often crack under high temperature of operating conditions, rendering the valve seal ineffective and necessitating costly replacement of the casing. Moreover, cooling conduits usually are required about the casings to counteract the adverse effects of the varying high temperatures, and one-piece casings having integral cooling conduits are difficult and expensive to cast. It is also known to provide such valve casings in a sheet steel welded construction. However, these present problems in providing sufficient strength to resist the axial thrust exerted thereagainst by the valve body. The weld joints of such constructions are zones of potential weakness, and are particularly subject to bending and shear stresses caused by heat and axial thrust.

Forging the casing is potentially desirable because it provides an integral, one-piece construction which can be formed from bar stock. However, considerable material is wasted in the formation of cooling conduits, thus rendering this type of construction per se economically undesirable.

SUMMARY OF THE INVENTION

An object of the present invention is to provide a slide valve casing which is of economical construction and formed to provide maximum strength under high temperature and pressure conditions. This is accomplished in accordance with my invention by providing a hybrid forged and welded casing construction comprising a forged sealing ring having an annular sealing face formed along one edge thereof and supported by a member having a flange portion coaxial with the sealing ring, the annular edge of the flange portion being welded to the other edge of the sealing ring. In this manner, the axial thrust of the valve body against the sealing ring acts in compression through the welded joint whereby bending and shearing stress at the welded joint is entirely avoided. The welded joint is thus eliminated as an adverse factor affecting the strength of the casing, the bend and shearing stresses acting only through the integral flange portion of the support member. Moreover, by providing a sealing ring having the foregoing shape, the same can be forged with a minimum waste of material and the entire hybrid forged and welded casing thus formed inexpensively.

Another particularly important object of the present invention is to provide such a hybrid forged and welded slide valve casing construction having maximum stability under adverse high temperature and pressure conditions. Warping or other undesirable yielding of the sealing face of the casing is substantially eliminated in accordance with my invention by forming the sealing ring, an annular portion of the support member immediately adjacent the flange portion and the flange portion itself to substantially the same thickness. In this manner, the portions of the sealing ring and support member most directly exposed to the high temperature environment undergo substantially uniform expansion and contraction, thus substantially eliminating distortion of the sealing face. Also in accordance with my invention, the exposed portions of the sealing ring and the support member form the inner walls of a cooling conduit extending about the casing whereby such portions are directly cooled, and the weld at the joint between the sealing ring and the flange portion is disposed on the side of the sealing ring and flange portion in the cooling conduit.

BRIEF DESCRIPTION OF THE DRAWING FIGURES

FIG. 1 is a fragmentary view, partly in section and partly in elevation, being taken about on line 1—1 of FIG. 3 on a reduced scale; showing a slide valve constructed in accordance with the present invention, portions thereof being broken away;

FIG. 2 is a fragmentary cross sectional view thereof taken about on line 2—2 of FIG. 1, with an associated conduit illustrated in broken lines;

FIG. 3 is a fragmentary, enlarged cross sectional view thereof taken about on line 3—3 of FIG. 1;

FIG. 4 is a fragmentary, enlarged cross sectional view thereof taken about on line 4—4 of FIG. 1; and FIG. 5 is a cross sectional view thereof taken about on line 5—5 of FIG. 2.

DESCRIPTION OF THE PREFERRED EMBODIMENT

There is shown in FIGS. 1 and 2 a presently preferred slide valve construction of this invention comprising a sliding valve body member generally designated 10 having an annular sealing face 11 (FIGS. 3 and 4) formed at one side thereof for sealing against a cooperating annular sealing face or seat 12 formed on a valve casing generally designated 13. Valve body 10 can be a hollow, disk-like member having paired inner walls 14 connecting between opposite end walls 15 and forming a pair of adjacent, convoluted passages 16 in open communication with one another at their inner ends, generally centrally of the valve body. The outer ends of passages 16 communicate with inlet and outlet conduits 17 and 18, respectively for transmitting cooling water into and out of body 10. Valve body 10 is slidable vertically as viewed in the drawings, into and out of sealing position within casing 13, the latter being located in a hot air conduit having, for example, an outer pipe casing 19, an insulator material 20 and a heat resistant inner liner 21. Valve body 10 can be lifted and lowered by any suitable means, not shown, in a manner well known in the art.

Slide valve casing 13 comprises a pair of axially spaced, annular support members 22 secured about their outer peripheries by bolts or the like, not shown, to a pair of retainer rings 23 welded or otherwise secured to pipe casing 19. Concentric inner and outer wall members 25 and 26 extend axially between and are welded to support members 22, as indicated at 27 (FIG. 4). The upper half of inner wall 25 comprises vertical housing wall portions 28 (FIG. 1) and semi-circular lateral rim portions 29. Wall portions 28 extend tangentially upwardly from the lower half of cylindrical inner wall 25, parallel to one another, to form the opposite sides of a slide body receiving chute or slot 30. The lower part of chute 30 is formed by an intermediate portion of the lower half of inner wall 25. Rim portions 29 complete the circular wall 25 on opposite sides of chute 30 between side edges 28.

A pair of axially spaced side walls 31 (FIG. 2), having lower edges forming the general outline of inner wall 25 are welded to wall portions 28 and to rim portions 29 to form the side walls of valve body receiving chute 30. Walls 31 also are welded at their outer lower periphery to inner wall 25 as at 32.

Outer wall 26 extends concentrically about inner wall 25 and is formed at its upper end to provide vertical wall and semi-circular rim portions 36 and 37, respectively. Wall portions 36 extend in parallel, outwardly spaced relation to chute wall portions 28 to form the outer side edges of the upper part of casing 13. Rim portions 37 extend concentrically with rim portions 29 to complete the outer circular wall about valve body 10 on opposite sides of chute 30. A pair of side walls 38 having edges forming the general outline of wall portions 36 and rim portions 37 are welded thereto in laterally outwardly spaced relation from walls 31 on opposite side of body receiving chute 30 to define a cooling jacket 39 about walls 31 and side edges 28 of chute 30. Walls 38 have a pair of outlets 40 opening therethrough on opposite sides of the upper end of cooling jacket 39.

As best seen in FIGS. 3 and 4, a pair of sealing rings 45 are provided, each having an integral, right-angle flange portion 46 along the inner edge thereof forming annular sealing faces 12. Sealing rings 45 are preferably forged to provide the high strength characteristics required in casings of this type, but they can be otherwise formed. The outer peripheral edges of flanges 46 are welded to the inner peripheral edges of side wall rings 33 as at 47. The inner peripheries of support members 22 also have inturned, right angle flanges 48 formed integrally therewith, and the annular edges of flanges 48 are welded to the outer side edges of sealing rings 45, as at 49. Sealing rings 45, support members 22, side walls 33 and wall 25 including the rim portions 29 thereof form a pair of axially spaced, annular cooling passages 34 on opposite sides of slot 30.

Passages 34 are provided with cooling water inlet conduits 50 at one end thereof and terminate in flanged portions 51 on opposite sides of a cleanout passage 52 (FIG. 1), the latter comprising a radial passage formed by radially enlarged portions 53 of side walls 33 and end walls 54. A closure plate 55 is welded or otherwise secured to the lower ends of enlarged portions 53 and end walls 54 and includes a conduit 56 controlled by a gate valve 57 communicating with cleanout passage 52 for discharging debris trapped in the bottom of slot 30. Cooling water thus flows into passages 34, about casing 13 past flange portion 51 into the area on opposite sides of enlarged portions 53 wherein the flow from each passage 34 splits to flow in opposite peripheral directions into a cooling chamber 58 defined between inner and outer walls 25 and 26 respectively, the flow from opposite sides of enlarged portions 53 on each side of cleanout passage 52 merging in chamber 58. Cooling water in chamber 58 flows upwardly about casing 13 and splits to flow in arcuate chambers 59 on opposite sides of chute 30 and into cooling jacket 39 between walls 31 and 38 to exhaust through outlets 40 on opposite sides of casing 13. Cleanout openings 60 are provided through outer wall 26 on opposite sides of cleanout passage 52 for cleaning chamber 58.

A pair of bars 61 extend radially through inner and outer walls 25 and 26 on diametrically opposite sides of casing 13 and are suitably secured to walls 25 and 26 in watertight relation. The inner ends of bars 61 project slightly into slot 30 to engage a pair of wedges 62 on opposite sides of valve body 10. In this manner, sealing face 11 of valve body 10 is urged axially against sealing face 12 on sealing ring 45 when valve body 10 slides downwardly into sealing position. While only one sealing face 11 on valve body 10 is illustrated body 10 could be provided with sealing faces 11 on its opposite sides. Valve casing 13 is thus formed symmetrically on opposite sides of body 10 to provide a sealing face 12 for valve bodies having a sealing face 11 on both sides or having a sealing face 11 on the side thereof opposite the illustrated form. When both sides of body 10 seal, the wedges are omitted.

It is a significant feature of the present invention that the foregoing casing can be economically constructed and fabricated to provide maximum strength. Sealing rings 45 and support members 22 preferably are forged as continuous rings in the respective shapes described and illustrated, and it is apparent that a minimum of material will be wasted in the forging thereof. The axially directed flanges 48 of support members 22 provide axial strength, the inner periphery 63 of each flange 48 being coaxial with and forming a continuous, smooth surface with the inner surface 64 of the associated sealing ring 45. Weld joints 49 between support member 22 and sealing ring 45 are subject primarily only to axial compression forces, with the shear forces being effectively resisted by the integral connection between flange 48 and support member 22 at 55. The high strength characteristics of the forged sealing rings thus are not compromised by the welded construction.

Of particular significance is the dimensional relationship between sealing rings 45 and the adjacent portions of support members 22, whereby maximum stability under adverse high temperature and pressure conditions is provided. As seen in FIGS. 4 and 5, the areas most directly exposed to the high temperature and pressure gases flowing in conduit 19 are the sealing rings 45 support member, flange portions 48 and the annular shear resisting portions 65 of support members 22 immediately adjacent flange portions 48. In accordance with the present invention, support members 22 are shaped down and these areas are formed to have substantially identical widths or thicknesses whereby irregular expansion and construction due to the temperatures and pressures in conduit 19 and resulting warping and distortion of sealing faces 12 is eliminated. Rings 45 and members 22 are formed of the same material, or materials having substantially the same coefficients of expansion, whereby whatever expansion and contraction occurs will be uniform and accordingly will not materially distort sealing faces 12 or otherwise render the casing ineffective.

Further, expansion and contraction of sealing faces 12 are reduced to a minimum, because sealing rings 45, support member portions 65 and flange portions 48 serve as walls of cooling passages 34 and are thereby in direct contact with the cooling water circulating therein. In this manner, expansion and contraction of the identical width areas of sealing ring 45 and support member 22 are effectively controlled.

Additionally, it is an important feature of my invention that weld joints 47 and 49 are located on the sides of sealing rings 45 disposed within cooling passages 34. As a result, welds 47 and 49 are not directly exposed to the high temperature and pressure conditions in conduit 19 but instead are directly exposed to the cooling water in passages 34. Welded joints 47 and 49 are thus not significantly weakened and can withstand such environments without rupturing.

Accordingly it is seen that my invention fully accomplishes its intended objects. It will be appreciated that the foregoing detailed disclosure is given by way of illustration and that I intend to be limited only as required by the scope of the appended claims.

Having fully disclosed and completely described my invention, what I claim as new is:

1. A slide valve casing comprising a sealing ring having an annular sealing face along one edge thereof for cooperation with the sealing face of a slide valve body, a substantially radial support member having an integral flange portion forming an axially extending supporting ring coaxial with said sealing ring and abutting the latter on the edge thereof remote from said sealing face, said rings defining a generally cylindrical passage, and means joining said sealing ring and said supporting ring to form a substantially smooth continuous inner surface from one ring to the other, said joining means including a peripheral weld formed at the abutting edges of said rings on the side thereof remote from said passage.

2. A slide valve casing according to claim 1 wherein said support member extends about said passage in a substantially radial plane with said flange portion extending substantially normal thereto, said sealing and supporting rings having substantially the same thickness, and the thickness of the radial portion of said support member immediately adjacent said flange portion being substantially the same as the thickness of said flange portion and said sealing ring.

3. A slide valve casing according to claim 2 together with means including said sealing ring and flange portion defining an annular chamber outwardly thereof, and means for introducing and exhausting coolant to and from said chamber, said sealing ring being forged and continuous and unbroken about said passage.

4. A slide valve casing according to claim 1 together with means including said sealing ring and said flange portion defining an annular chamber outwardly of said sealing ring and flange portion, and means for introducing and exhausting coolant to and from said chamber, said weld being directly exposed to the coolant in said passage.

5. A slide valve casing according to claim 1 wherein said sealing ring is a forging which is continuous and unbroken about said passage.

6. A slide valve casing according to claim 1 wherein said support member extends about said passage in a substantially radial plane with said flange portion extending substantially normal thereto, said support member having a thickness substantially greater than the thickness of said sealing ring and flange portion and tapering inwardly to form an annular portion immediately adjacent said flange portion having a thickness substantially the same as the thickness of said sealing ring and said flange portion.

7. A slide valve casing according to claim 1 together with a second sealing ring coaxial with and axially spaced from the first mentioned sealing ring and forming a slot therebetween for receiving a slide valve, a second support member having an integral flange portion forming a supporting ring coaxial with said second sealing ring and abutting the latter on the side thereof remote from said slot, and means joining said second sealing ring and said second supporting ring to form a substantially smooth continuous inner surface from one of said second rings to the other, said joining means including a peripheral weld formed at the abutting ends of said second rings and on the side thereof remote from said passage.

8. A slide valve casing according to claim 7 wherein said first and second sealing rings and said support members are forgings which are continuous and unbroken about said passage.

9. A slide valve casing according to claim 7, wherein said support members extend about said passage in substantially radial planes with said flange portions extending substantially normal thereto, said support members having portions of a thickness substantially greater than said flange portions outwardly thereof and having annular portions of reduced thickness immediately adjacent said flange portions, said reduced thickness portions having substantially the same thickness as said flange portions and said sealing rings.

10. A slide valve casing according to claim 9, together with an inner wall generally concentric with said sealing rings extending between said support members adjacent said reduced thickness portions, said inner wall with said support members and said sealing rings defining a pair of annular cooling chambers around said sealing rings, and an outer wall generally concentric with said inner wall also extending between said support members.

References Cited

UNITED STATES PATENTS

| | | | |
|---|---|---|---|
| 2,884,959 | 5/1959 | Neely | 137—340 XR |
| 3,068,888 | 12/1962 | Mohr | 137—340 |
| 3,202,171 | 8/1965 | Rappold et al. | 137—340 |
| 3,266,517 | 8/1966 | Carr | 137—340 |
| 3,267,954 | 8/1966 | Uerlichs | 137—340 |
| 3,381,702 | 5/1968 | Carr | 137—340 |
| 3,394,728 | 7/1968 | Uerlichs | 137—340 |

SAMUEL SCOTT, Primary Examiner